(12) United States Patent
Roy et al.

(10) Patent No.: US 12,408,052 B2
(45) Date of Patent: Sep. 2, 2025

(54) MEASUREMENT CONFIGURATION IN NON-TERRESTRIAL NETWORK (NTN)

(71) Applicant: MediaTek Singapore Pte. Ltd., Singapore (SG)

(72) Inventors: Abhishek Roy, San Jose, CA (US); Mehmet Kunt, Cambridge (GB); Pradeep Jose, Cambridge (GB); Abdelkader Medles, Cambridge (GB)

(73) Assignee: MediaTek Singapore Pte. Ltd., Singapore (SG)

( * ) Notice: Subject to any disclaimer, the term of this patent is extended or adjusted under 35 U.S.C. 154(b) by 553 days.

(21) Appl. No.: 17/546,945

(22) Filed: Dec. 9, 2021

(65) Prior Publication Data

US 2022/0225132 A1   Jul. 14, 2022

Related U.S. Application Data

(60) Provisional application No. 63/135,041, filed on Jan. 8, 2021.

(51) Int. Cl.
*H04W 24/08*   (2009.01)
*H04B 7/185*   (2006.01)

(52) U.S. Cl.
CPC ........ *H04W 24/08* (2013.01); *H04B 7/18513* (2013.01); *H04B 7/18519* (2013.01)

(58) Field of Classification Search
CPC ........... H04B 7/18513; H04B 7/18519; H04W 24/04

(Continued)

(56) References Cited

U.S. PATENT DOCUMENTS

2022/0039039 A1*   2/2022   Maattanen .......... H04W 56/006
2022/0046498 A1*   2/2022   Cheng .................. H04B 7/1851
(Continued)

FOREIGN PATENT DOCUMENTS

| CN | 110679180 A | 1/2020 |
| CN | 111278042 A | 6/2020 |
| WO | WO 2020/092732 A1 | 5/2020 |

OTHER PUBLICATIONS

Combined Chinese Office Action and Search Report issued on May 10, 2023 in Chinese Patent Application No. 202111628559.5 (with English Translation of Category of Cited Documents), 10 pages.

(Continued)

*Primary Examiner* — Faruk Hamza
*Assistant Examiner* — Jean F Voltaire
(74) *Attorney, Agent, or Firm* — Helen Mao; Imperium Patent Works

(57) ABSTRACT

A method includes receiving a measurement configuration from a serving cell of a user equipment (UE) in a non-terrestrial network (NTN) providing mobile communication service based on satellites. The satellites can be low Earth orbiting (LEO) satellites, geostationary Earth orbiting (GEO) satellites, and the like. The measurement configuration indicates a first synchronization signal block (SSB) based measurement timing configuration (SMTC) and a second SMTC. The first SMTC specifies first SMTC windows aligning with SSB signals from the serving cell of the UE. The second SMTC specifies second SMTC windows aligning with SSB signals from a first neighbor cell of the UE. The serving cell is associated with a first flying object, and the first neighbor cell is associated with a second flying object. The UE performs a measurement based on the first SMTC corresponding to the serving cell and the second SMTC corresponding to the first neighbor cell.

17 Claims, 6 Drawing Sheets

(58) Field of Classification Search
USPC ........................................................ 370/252
See application file for complete search history.

(56) References Cited

U.S. PATENT DOCUMENTS

| | | | |
|---|---|---|---|
| 2022/0248282 A1* | 8/2022 | Fu ..................... | H04L 27/2657 |
| 2022/0263569 A1* | 8/2022 | Fan .................... | H04W 56/001 |
| 2023/0284060 A1* | 9/2023 | Euler .................. | H04W 24/10 |
| | | | 370/329 |
| 2024/0080687 A1* | 3/2024 | Xiong ................. | H04W 48/16 |

OTHER PUBLICATIONS

"Discussion on SSB measurement in NTN", 3GPP TSG-RAN2 Meeting #108, R2-1915189, Reno, USA, Nov. 18-22, 2019, pp. 1-5.

"Idle mode procedures in NR NTN", 3GPP TSG-RAN2 Meeting #112-e, R2-2009255, Online, Nov. 2-Nov. 13, 2020, pp. 1-6.

"Report of [Post111-e] [911] [NTN] Connected mode aspects (ZTE)", 3GPP TSG-RAN WG2 Meeting #112-E, R2-2009803, Electronic, Nov. 2-13, 2020, 49 pages.

Combined Taiwanese Office Action and Search Report issued May 17, 2022 in Patent Application No. 111100324 (with English translation of Category of Cited Documents), 6 pages.

Combined Chinese Office Action and Search Report issued Jan. 18, 2024 in Chinese Patent Application No. 202111628559.5 (with English translation of Categories of Cited Documents), 8 pages.

\* cited by examiner

MEASUREMENT CONFIGURATION IN NON-TERRESTRIAL NETWORK (NTN)

INCORPORATION BY REFERENCE

This present application claims the benefit of U.S. Provisional Application No. 63/135,041, "Improving SMTC and Measurement Gap Configurations in LEO-NTN", filed on Jan. 8, 2021, which is incorporated herein by reference in its entirety.

TECHNICAL FIELD

The present disclosure relates to non-terrestrial network (NTN) based communications.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Non-terrestrial networks (NTN) can include satellite communication networks, high altitude platform systems (HAPS), air-to-ground networks, unmanned aerial vehicles (UAV), and the like. Satellite communication networks can be based on low Earth orbiting (LEO) satellites, medium Earth orbiting (MEO) satellites, and geostationary Earth orbiting (GEO) satellites. The 3rd Generation Project Partnership (3GPP) is developing new standards to adapt 5G New Radio (NR) to NTNs.

SUMMARY

Aspects of the disclosure provide a method. The method can include receiving a measurement configuration from a serving cell of a user equipment (UE) in a non-terrestrial network (NTN). The NTN provides mobile communication service based on satellites belonging to the NTN. The satellites can be low Earth orbiting (LEO) satellites, geostationary Earth orbiting (GEO) sate, and the like. The measurement configuration indicates a first synchronization signal block (SSB) based measurement timing configuration (SMTC) and a second SMTC. The first SMTC specifies first SMTC windows aligning with SSB signals from the serving cell of the UE. The second SMTC specifies second SMTC windows aligning with SSB signals from a first neighbor cell of the UE. The serving cell is associated with a first satellite, and the first neighbor cell is associated with a second satellite. The UE performs a measurement based on the first SMTC corresponding to the serving cell and the second SMTC corresponding to the first neighbor cell. In an embodiment, the serving cell and the first neighbor cell operate on a first carrier.

In an embodiment, the measurement configuration further indicates a third SMTC that specifies third SMTC windows aligning with SSB signals of a second neighbor cell of the UE operating on a second carrier, and a fourth SMTC that specifies fourth SMTC windows aligning with SSB signals of a third neighbor cell of the UE operating on the second carrier.

In an embodiment, the measurement configuration further indicates a first measurement gap configuration corresponding to the second neighbor cell and a second measurement gap configuration corresponding to the third neighbor cell, the first measurement gap specifying measurement gaps that are aligned with the third SMTC windows, the second measurement gap specifying measurement gaps that are aligned with the fourth SMTC windows. The method can further include performing a measurement on the second carrier based on the first measurement gap configuration, the second measurement gap configuration, the third SMTC, and the fourth SMTC.

In an embodiment, the method can further include receiving information indicating a position of the second satellite associated with the first neighbor cell from the serving cell. The information indicating the position of the second satellite can include one of position-velocity-time (PVT) information of the second satellite, or orbital ephemeris parameters of the second satellite. An SMTC offset can be determined based on the position of the second neighbor cell. The SMTC offset is based on a timing of the serving cell. The SMTC offset can be one of a time offset with respect to the first SMTC, a time offset with respect to the second SMTC, or a time offset indicating a starting position of an SMTC window within a periodicity of the second SMTC. The SMTC offset can be transmitted to the serving cell. In an example, the information further indicates a feeder link delay of the first neighbor cell.

In an embodiment, the method can further include determining a measurement gap offset based on a position of a third satellite associated with the second neighbor cell. The measurement gap offset can be based on a timing of the serving cell. The measurement gap offset being one of a time offset with respect to the first measurement gap configuration corresponding to the second neighbor cell, a time offset with respect to the first SMTC, a time offset indicating a starting position of a measurement gap within a periodicity of the first measurement gap configuration corresponding to the second neighbor cell. The measurement gap offset can be transmitted to the serving cell.

In an embodiment, the method can further include receiving from the serving cell an updated measurement configuration that indicates a fifth SMTC corresponding to the first neighbor cell of the UE and determined based on the SMTC offset, and a third measurement gap configuration corresponding to the second neighbor cell and determined based on the measurement gap offset. The updated measurement configuration can indicate the fifth SMTC by providing the SMTC offset and the third measurement gap configuration by providing the measurement gap offset.

In an example, the updated measurement configuration is received using a MAC CE or RRC signaling. In an example, the method further include transmitting a MAC CE, a HARQ feedback, or an RNTI to the serving cell to confirm reception of the updated measurement configuration. In an example, the method can further include receiving from the serving cell a confirmation corresponding to one of the SMTC offset and the measurement gap offset.

In an embodiment, the method can further include transmitting information indicating a location of the UE to the serving cell, and receiving an update indicating an SMTC offset corresponding to one of the first, second, and third neighbor cells and a measurement gap offset corresponding to one of the second and third neighbor cells.

In an embodiment, the method can further include receiving periodically an update of an ephemeris, PVT information, and/or a feeder link delay of the second satellite associated with the first neighbor cell from the serving cell through one or a combination of a system information block (SIB), a radio resource control (RRC) signaling, and a MAC control element (CE).

In an embodiment, the method can further include determining an SMTC offset corresponding to the first neighbor cell based on a long-term ephemeris of the second satellite, determining a measurement gap offset corresponding to the second neighbor cell based on a long-term ephemeris of a third satellite associated with the second neighbor cell, and transmitting the SMTC offset and the measurement gap offset to the serving cell.

In an embodiment, the method can further include transmitting an SMTC offset and a measurement gap offset in response to one of an SSB signal moving out of the measurement gaps specified by one of the first and second measurement gap configurations, a request from the serving cell, a propagation delay of one of the first, second, and third neighbor cells changing by an amount equal to a threshold, expiry of a timer, and a location change of the UE by a certain margin.

In an embodiment, the method can further include transmitting an SMTC offset to the serving cell using a MAC CE or RRC signaling. In an embodiment, the method further include performing measurement based on the SSB signals of the second neighbor cell, wherein the SSB signals of the second neighbor cell are non-uniform and include a sequence of periodically transmitted first SSB bursts, and at least one of the first SSB burst is appended or prepended with a second SSB burst in time domain.

In an embodiment, the method can further include performing measurement based on the SSB signals of the second neighbor cell, wherein the SSB signals of the second neighbor cell include a sequence of periodically transmitted first SSB bursts, and for each first SSB burst overlapping with the measurement gaps of the first measurement gap configuration, a second SSB burst that is adjacent to the respective first SSB burst in time domain.

Aspects of the disclosure provide an apparatus comprising circuitry. The circuitry can be configured to receive a measurement configuration from a serving cell of a UE in a NTN providing mobile communication service based on satellites belonging to the NTN, the satellites being low Earth orbiting (LEO) satellites or geostationary Earth orbiting (GEO) satellites, the measurement configuration indicating a first SMTC and a second SMTC, the first SMTC specifying first SMTC windows aligning with SSB signals from the serving cell of the UE, the second SMTC specifying second SMTC windows aligning with SSB signals from a first neighbor cell of the UE, the serving cell associated with a first satellite, the first neighbor cell associated with a second satellite, and performing a measurement based on the first SMTC corresponding to the serving cell and the second SMTC corresponding to the first neighbor cell.

Aspects of the disclosure provide a non-transitory computer-readable medium storing instructions that implement the method.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
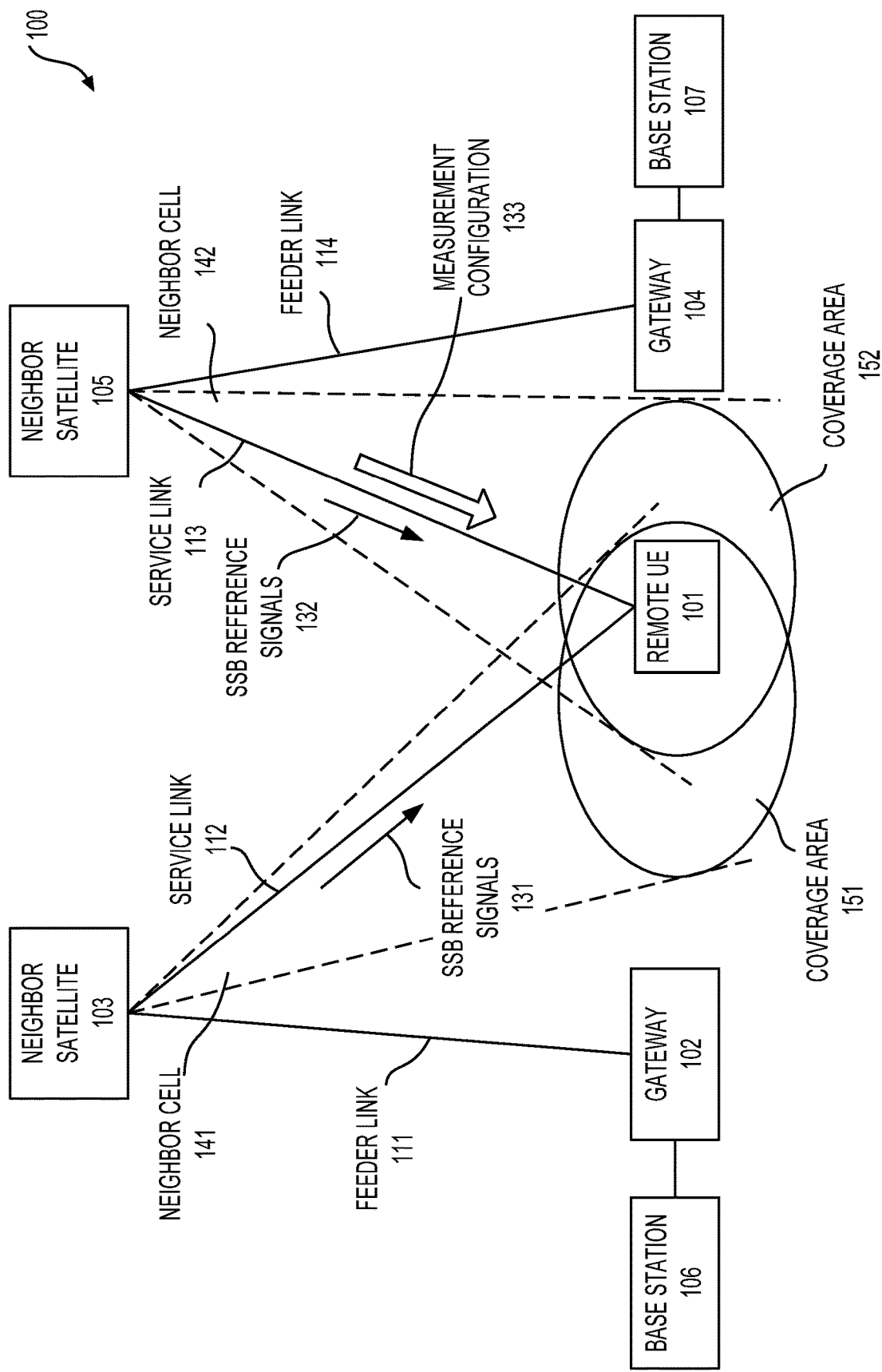
FIG. 1 shows a non-terrestrial network (NTN) 100 according to some embodiments of the disclosure.

FIG. 1 shows a non-terrestrial network (NTN) 100 according to some embodiments of the disclosure. The NTN 100 can include a user equipment (UE) 101, a first gateway 102, a first satellite 103, a second gateway 104, and a second satellite 105. Those elements are wirelessly coupled together with radio links 111-114 as shown in FIG. 1. The feeder link 111 connects the first gateway 102 and the neighbor satellite 103. The service link 112 connects the neighbor satellite 103 and the UE 101. The feeder link 114 connects the second gateway 104 and the serving satellite 105. The service link 113 connects the UE 101 and the serving satellite 105.

The satellite 103 or 105, for example, can be a low Earth orbit (LEO) satellite, a medium Earth orbit (MEO) satellite, a geostationary Earth orbiting (GEO) satellite, or the like. The satellite 103 or 105 can embark a payload which can be either a transparent payload or a regenerative payload in various embodiments. The UE 101 can be a handheld terminal (e.g., a mobile phone, a laptop), a very small aperture terminal (VSAT), and the like. The gateway 102 or 103 connect the respective satellite 103 or 105 to a core network (not shown), such as a fifth-generation (5G) core network, an evolved packet core (EPC), and the like.

The NTN 100 can employ 5G New Radio (NR) technologies that are adapted for NTN-based communications. In an example, a first base station 106 can be deployed between the first gateway 102 and the 5G core network. The first base station 106 can provide a first cell 141 to communicate with the UE 101. A second base station 107 can be deployed between the second gateway 104 and the 5G core network. The second base station 107 can provide a second cell 142 to communicate with the UE 101. The first cell 141 and the second cell 142 can operate over a same carrier at a same frequency position or over different carriers. The UE 101 can be located within a coverage area 151 of the first cell 141 and a coverage area 152 of the second cell 142.

The UE 101 can be connected with the second cell 142, for example, in a radio resource control (RRC) connected mode. Accordingly, the second cell 142 is a serving cell of the UE 101, while the first cell 141 is referred to as a neighbor cell of the UE 101. The first satellite 103 and the second satellite 105 are referred to as a neighbor satellite and a serving satellite, respectively. The UE 101 can communicate with the base station 106 or 107 using a Uu interface adapted from the 5G NR radio interface. For example, the UE 101 can use the 5G NR protocols (after adaptation or enhancement) to communicate with the base station 106 or 107.

While in connection with the serving cell 142, the UE 101 may perform radio resource management (RRM) measurement according to a measurement configuration 133 received from the serving cell 142. For example, measurement results of the RRM measurement can be reported to the base station 107 to trigger a handover operation or can be used locally to trigger a conditional handover.

The RRM measurement can be performed in both the neighbor cell 141 and the serving cell 142. For example, in the serving cell 142, the RRM measurement is performed using reference signals 132 transmitted from the serving satellite 105. In the neighbor cell 141, the RRM measurement is performed using reference signals 131 transmitted from the neighbor satellite 103. The reference signals 131 or 132 can each be a sequence of synchronization signal block (SSB) bursts. The sequence of SSB bursts can have a similar or same structure as those defined in the 3rd Generation Project Partnership (3GPP) 5G NR standards.

In a 5G terrestrial network (NT), the delay difference between reference signals from neighboring base stations is small and fixed. In contrast, in the NTN 100, the delay difference between the SSB reference signals 131 and 132 can be large and constantly changing due to the long distances of the feeder links 111 and 114 and the service links 112 and 113 and the mobility of the satellites 103 and 105.

For example, a first propagation delay of the SSB reference signals 131 from the base station 106 can be the time for propagation over a distance of the feeder link 111 and the service link 112. A second propagation delay of the SSB reference signals 132 from the base station 107 can be the time for propagation over a distance of the feeder link 114 and the service link 113. Two SSB bursts, one in the SSB reference signals 131 and one in the SSB reference signal 132, can be time-aligned when being transmitted from the base stations 106 and 107. The two time-aligned SSB bursts can be apart from each other when reaching the UE 101 due to the delay difference between the first and second propagation delays.

Depending on the deployment and type of the NTN 100, the maximum delay difference between the SSB reference signals 131 and 132 can be in a range from several milliseconds (ms) to hundreds of ms. In an example of a LEO NTN with a satellite altitude of 600 km, the maximum delay difference can be several milliseconds. The delay difference can thus vary from 0 ms to several ms.

Aspects of the disclosure provide mechanisms for the determination and update of measurement configurations to handle the large and changing reference signal propagation delays or delay differences. The measurement configurations under discussion can include SSB-based measurement timing configuration (SMTC) and measurement gap configuration.

It is noted that different from the FIG. 1 example, the base stations 106 and 107 may be deployed to be payloads of the satellites 103 and 105, respectively. In such a scenario, the propagation delays of the reference signals 131 and 132 would be proportional to the service links 112 and 113, respectively.

While satellite-based NTNs are used as examples for illustrating the schemes, the techniques disclosed herein are not limited to satellite-based NTNs. For example, the schemes can be applied or adapted to other types of NTNs including high altitude platform systems (HAPS), air-to-ground networks, unmanned aerial vehicles (UAV), and the like.

Figure 2:
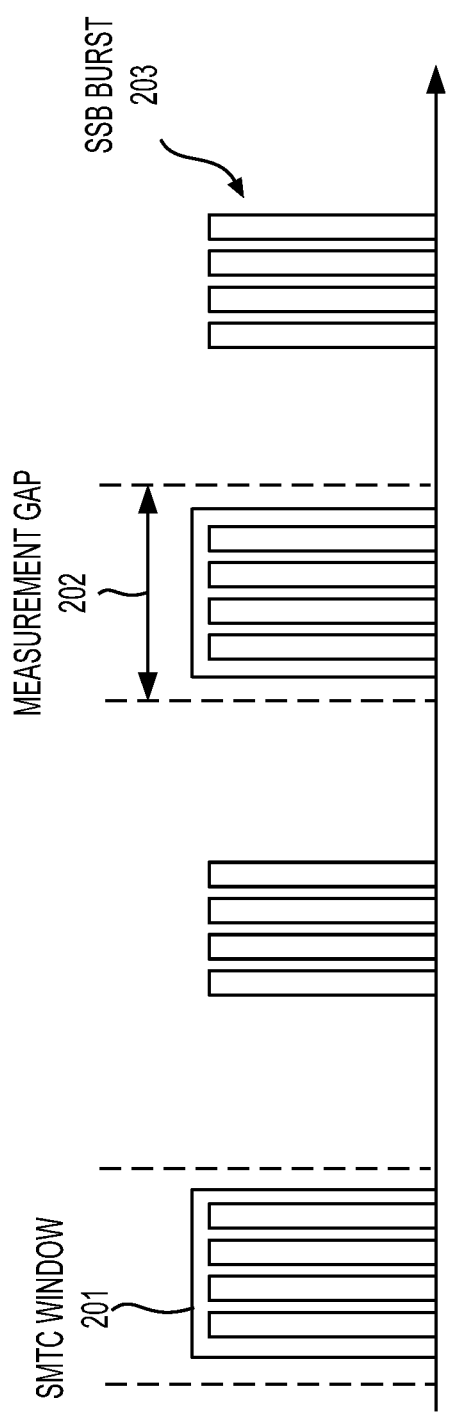
FIG. 2 shows an example of synchronization signal block (SSB) based measurement timing configuration (SMTC) windows 201 and measurement gaps 202 in alignment with a sequence of SSB bursts 203.

FIG. 2 shows an example of SMTC windows 201 and measurement gaps 202 in alignment with a sequence of SSB bursts 203. In an example, each SSB burst 203 can include a sequence of SSBs. Each SSB can include a primary synchronization signal (PSS), a secondary synchronization signal (SSS), and a physical broadcast channel (PBCH). Each SSB can span 4 orthogonal frequency division multiplexing (OFDM) symbols in an example. The SSB bursts 203 can each be limited in a 5 ms window and transmitted with a periodicity of 5, 10, 20, 40, 80, and 160 ms in an example.

In an example, a measurement configuration (e.g., the measurement configuration 133 in FIG. 1) can be transmitted from the base station 107 to the UE 101 through radio resource control (RRC) signaling. The measurement configuration can include parameters of measurement objects, reporting configurations, measurement identities, quantity configurations, measurement gaps, and the like. Each measurement object can indicate frequency location and subcarrier spacing of reference signals (e.g., SSB bursts 203) to be measured.

Each measurement object can further provide at least one SMTC that indicates the timings of the to-be-measured reference signals. For example, for the sequence of the SSB bursts 203, an SMTC is provided to specify a periodicity, a duration, and a time offset for the SMTC windows 201. For example, the time offset of the SMTC can indicate a starting position of an SMTC window within the periodicity of the SMTC. According to the configured SMTC windows 201, the UE 101 can know the timings of the SSB bursts so that the UE 101 can capture the reference signals to measure the reference signals.

The types of measurement performed by the UE 101 can include inter-frequency measurement and intra-frequency measurement. Measurement gaps (e.g., the measurement gaps 202) can be configured for intra-frequency measurement (where the to-be-measure reference signals can be located on a bandwidth part other than a bandwidth part the UE 101 is operating on) and inter-frequency measurement. For example, periodicity, duration, and a time offset can be indicated to specify the measurement gaps 202. For example, the time offset of the measurement gaps 202 can indicate a starting position of a measurement gap within the periodicity of the measurement gaps 202. During each measurement gap 202, the UE 101 may tune its radio frequency module from a current operating frequency of its serving cell to a target to-be-measured frequency of its neighbor cell to perform a measurement. Because the base station 107 and the UE 101 have the same understanding about when the measurement gaps take place, no data transmission between the base station 107 and the UE 101 would be scheduled or performed, and thus no data would be missed.

In some examples, a measurement object and associated SMTC windows and measurement gaps can be specified for a list of cells operating over a same frequency. Accordingly, an SMTC window can be aligned with SSB signals transmitted from multiple cells. Such a mechanism is suitable for certain terrestrial network (TN) scenarios where reference signals from different base stations may have small and fixed propagation delay differences. However, for NTN scenarios where reference signals from different base stations may have large and variable propagation delay differences, the SSB signals from different sources, when reaching the UE 101, may span or drift in time domain so that become outside of the preconfigured SMTC windows.

Figure 3:
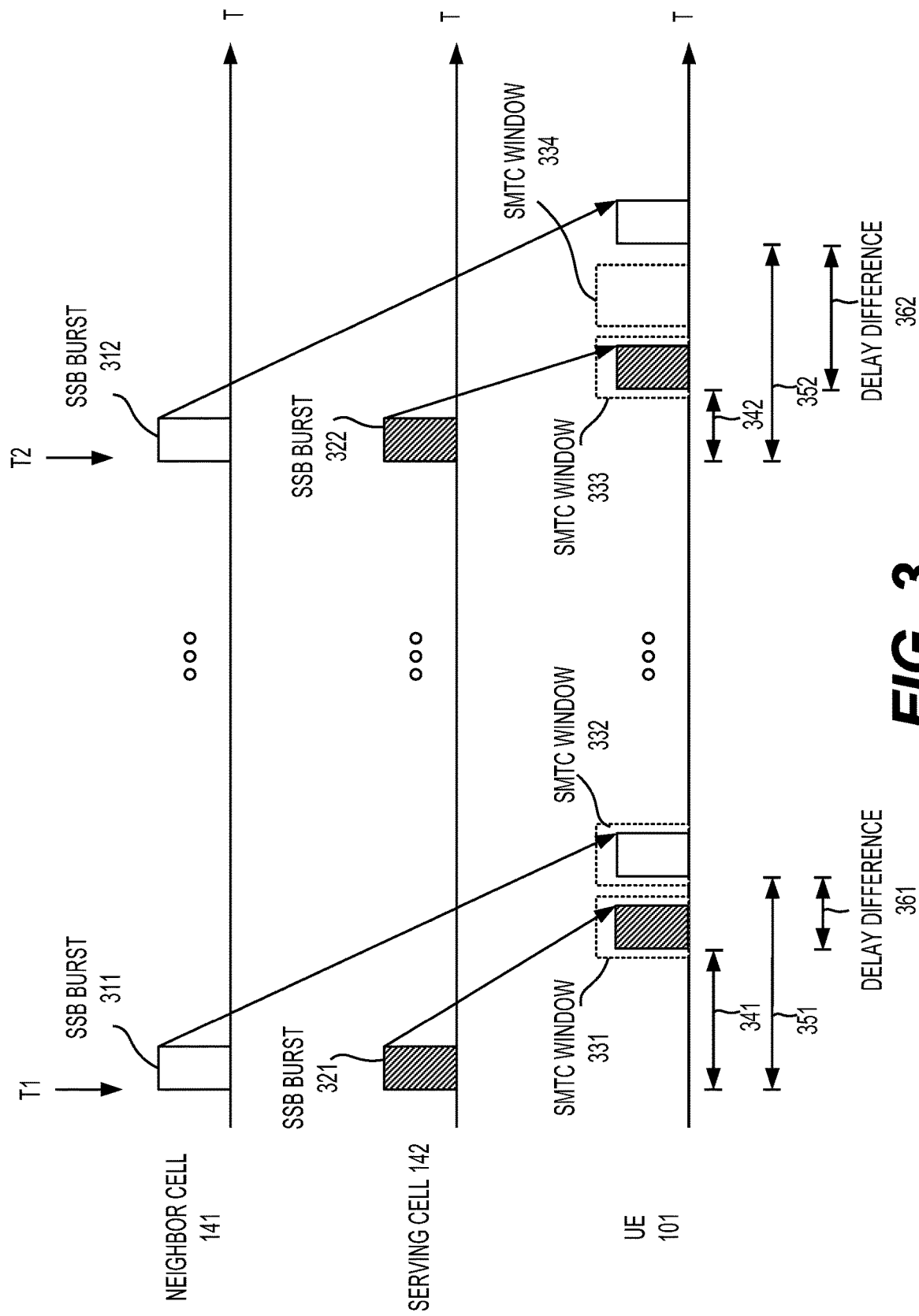
FIG. 3 shows timings of SSB reference signals from the neighbor cell 141 and the serving cell 142 at the UE 101.

FIG. 3 shows timings of SSB reference signals from the neighbor cell 141 and the serving cell 142 at the UE 101. The neighbor cell 141 and the serving cell 142 can operate on a same carrier or different carriers. At time T1, SSB bursts 311 and 321 are transmitted from the neighbor cell 141 and the serving cell 142, respectively, and later arrive at the UE 101 after propagation delays 341 and 351, respectively. A delay difference 361 is incurred. At a later time T2, SSB bursts 312 and 322 are transmitted from the neighbor cell 141 and the serving cell 142, respectively, and later arrive at the UE 101 after propagation delays 342 and 352, respectively. A delay difference 362 is incurred.

As shown, the SSB bursts from the neighbor cell 141 and the serving cell 142 are originally synchronized but apart from each other when arriving at the UE 101. If one SMTC indicating SMTC windows 331 and 333 is configured to the UE 101 based on the time of the serving cell 142 (or the UE 101), the UE 101 can capture the SSB bursts 321 and 322 but cannot capture the SSB bursts 311 and 312 if the UE 101 follows this SMTC.

To solve this issue, in some embodiments, multiple SMTCs can be configured on a per-cell basis for cells operating over a same frequency. Each SMTC can be aligned with the timings of SSB reference signals of the respective cell based on information of the propagation delays of each cell. As shown in FIG. 2, the UE 101 can be configured a second SMTC corresponding to the neighbor cell 141. The second SMTC indicates SMTC windows 332 and 334. The timings of the second SMTC (based on the time at the serving cell 142) can be determined based on information of the propagation delays 341 and 351 or the delay difference 351). Consequently, at the left side of FIG. 3, the two sets of SMTC windows 331 and 332 can be suitably aligned with the SSB bursts 321 and 311, respectively, and facilitate the UE 101 to correctly capture the reference signals.

However, at the right side of FIG. 3, the SSB burst 312 drifts outside the SMTC window 334 at the UE 101. Due to the mobility of the satellites 103 and 105, the delay difference between a pair of initially time-aligned SSB bursts is constantly changing. The second SMTC assuming a fixed delay difference cannot always be aligned with the target SSB reference signals.

To solve the issue, in some embodiments, SMTCs configured for neighbor cells on a per-cell basis can be continually updated. The update can be periodic or can be triggered by some indications or events. The indications or events can be associated with the variations of the propagation delay differences between the neighbor cells and a serving cell of a same UE.

Corresponding to the SMTCs configured and updated on a per-cell basis, measurement gaps can also be configured and updated on the per-cell basis in various embodiments. In this way, measurement gaps can be aligned with respective SMTC windows.

Embodiments of various mechanisms for determining and updating neighbor cell SMTCs and measurement gap configurations are described herein. The mechanisms enable a UE to track the shifts of SMTC windows and measurement gaps and provide solutions to main the network and the UE in sync with regards to the shifts. The NTN 100 in FIG. 1 is used as an example for the explanation of the various mechanisms.

The fundamental problem of measurement configuration in a NTN is how to align the SMTC and measurement gap configuration for a UE such that it can reliably measure a neighbor NTN cell. In some embodiments, the following constraints are considered while designing an efficient solution:

The serving cell knows the measurement gap configuration for the UE (to avoid scheduling the UE during that time).

UE location may or may not be available at the serving cell.

The configuration (for SMTC and measurement gap) changes with time as the satellites move.

Long term ephemeris for neighbor satellites may or may not be available at the UE.

Feeder link delay for neighbor cell satellites (as a function of time) may or may not be required.

One way delay (not round trip delay (RTD)) is considered for SMTC.

More than one neighbor satellite can be measured using one SMTC and measurement configuration.

Given that a satellite, for example, in LEO scenario, may be in view by the UE only for a few minutes, SMTC and measurement gap configurations can be optimized for the best trade-off between latency/overhead for cell search and measurement processing and report.

In some embodiments, the location of the UE 101 is not known by the network (e.g., the serving cell 142 or the base station 107). For example, for security or privacy consideration, the network cannot obtain the location of the UE 101. In such a scenario, SMTC and measurement gap configuration and update can be performed as follows.

The network can periodically provide the location information (e.g., position, velocity, and time (PVT) information, orbit ephemeris parameters, or the like) of neighbor cells and optionally feeder link delays of the neighbor cells to the UE 101. The UE 101 can update the SMTC and measurement gap configuration regularly and inform the network about the updated configurations by sending a report. The report can, for example, include one or more time offsets. In various examples, the time offsets can take various forms. For example, for updating the SMTC of a neighbor cell, an SMTC offset can be a time offset from a previous SMTC configuration of the neighbor cell that was provided to the UE 101 by the network; a time offset with respect to an SMTC of a serving cell; or, a time offset indicating a starting position of an SMTC window within a periodicity of the SMTC of the neighbor cell. For updating the measurement gap configuration of a neighbor cell, a measurement gap offset can be a time offset from a previous measurement gap configuration of the neighbor cell that was provided to the UE 101 by the network; a time offset with respect to an SMTC of a serving cell; or, a time offset indicating a starting position of a measurement gap within a periodicity of the measurement gap configuration of the neighbor cell.

For example, for the neighbor cell 141, the UE 101 can determine a current location of the satellite 103 based on the PVT information or ephemeris of the satellite 103. The UE 101 can also obtain a location of itself based on a global navigation satellite system (GNSS). Based on the location of the satellite 103 and the location of the UE 101, the UE 101 can determine a propagation delay of the service link 112. Additionally, the serving cell 142 may provide a propagation delay of the feeder link 111 to the UE 101. Based on the propagation delays of the service link 112 and the feeder link 111. A propagation delay of the reference signals 131 can be determined. In a similar manner, based on the PVT information of the serving satellite 105 and a propagation delay of the feeder link 114, a propagation delay of the reference signals 132 can be determined. Subsequently, a current delay difference between the propagation delays of the reference signals 131 and 132 can be determined.

An original SMTC and measurement gap of the UE 101 can be obtained as follows in an example. The serving cell 142 can first determine a first SMTC for the serving cell 142 with respect to a UE at a central location of the coverage area 152. Based on a delay difference between the reference signals 131 and 132 with respect to the central location of the coverage area 151, a second SMTC can be determined for the neighbor cell 141 with respect to the UE at the central location of the coverage area 152. The second SMTC has a time offset with respect to the first SMTC. The time offset is equal to the delay difference between the reference signals 131 and 132 with respect to the central location of the coverage area 151. A measurement gap configuration aligned with the first and second SMTCs can accordingly be determined.

The serving cell 142 provides the above first and second SMTCs and the above measurement gap configuration to the UE 101. Accordingly, the UE 101 can derive original SMTCs corresponding to the serving cell 142 and the neighbor cell 141 further based on the location of the UE 101.

Based on the timing of the original SMTC of the neighbor cell 141 and the current delay difference between the propagation delays of the reference signals 131 and 132, a time offset between the original SMTC and a current SMTC (or an updated SMTC) can thus be determined. This offset can be reported from the UE 101 to the serving cell 142. It is noted that the time offset can be a positive or a negative value indicating the current SMTC being earlier or later than the original SMTC with respect to the time of the serving cell 142. A current measurement gap configuration (or an updated measurement gap configuration) can also be determined by aligning the current measurement gaps with the updated SMTC.

In another example, instead of reporting an offset with respect to a previous SMTC of the neighbor cell 141, a time offset with respect to an SMTC of the serving cell 142 or a time offset indicating a starting position of an SMTC window within a periodicity of the SMTC of the neighbor cell 141 can be derived accordingly and reported to the UE 101. In another example, an offset with respect to an SMTC configuration last calculated/reported by the UE 101 can be determined and reported to the network.

In alternative examples, the base stations 106 and 107 are deployed as payloads of the satellites 103 and 105, respectively. In this scenario, feeder link delays can be ignored for determining propagation delays of the reference signals 131 and 132.

In an embodiment, after receiving the report from the UE 101, the network can update the SMTC and measurement gap configuration based on the time offset included in the UE report. The network can further send a set of updated SMTC and measurement gap configuration to the UE 101. The UE 101 can perform measurements according to the updated configuration. Alternatively, in an embodiment, the UE 101 may shift the SMTC and measurement gap configuration by itself and report the time offset to the network. Optionally, the UE 101 receives a confirmation from the network.

In some embodiments, the location of the UE 101 is known by the network (e.g., the serving cell 142 or the base station 107). The location information of the UE 101 can be accurate or coarse in various examples. In addition, the network can have the location information of the satellites 103 and 105 and propagation delay information of the feeder links 111 and 114. Based on the information, the base station 107 can determine a delay difference between the reference signals 131 and 132. While the satellites 103 and 105 are moving, the base station 107 can regularly determine a time offset that can be a change of a current delay difference to a prior delay difference. This time offset can be used to indicate or derive an update to the SMTC and measurement gap configuration and provided to the UE 101.

In some embodiments, long-term ephemerides for neighbor cells are available at the UE 101. The UE 101 can accordingly determine an update of an SMTC offset and a measurement gap configuration for the neighbor cell 141 regularly. The UE 101 can inform the network about the update by sending a report. In an example, a long-term ephemeris of the neighbor cell 141 is transmitted infrequently than a short-term ephemeris of the neighbor cell 141. For example, the long-term ephemeris can be transmitted in the order of several seconds, while the short-term ephemeris can be transmitted in the order of several milliseconds. The short-term ephemeris can be more fine-grained than the long-term ephemeris and have a higher accuracy.

In some embodiments, the network can provide (1) long term or short term neighbor cell ephemerides or location information in form of PVT, and/or (2) optionally feeder link delay information to the UE 101 by using one of the following means:

By using dedicated system information block (SIB) from the serving cell 142 that is common for UEs in the coverage area 152 of the serving cell 142.

By using dedicated RRC signaling, for example, within a measurement configuration.

By using a combination of both SIB and RRC signaling.

By introducing a new MAC control element (CE).

In some embodiments, the UE 101 can report updates of measurement gap configuration and optionally SMTC configuration to the network by using one of the following options:

MAC CE. A scheduler at a MAC layer of the network can use the information for scheduling.

RRC signaling.

In addition, the above updates of measurement gap configuration and optionally SMTC configuration can be provided on a per neighbor cell basis. In an example, the updates can be in the form of a time offset between a current configuration and a previous configuration. In an example, the updates can be in the form of a time offset between a current neighbor cell configuration (an SMTC or a measurement gap) and a serving cell configuration (an SMTC). In an example, the updates can be in the form of a time offset indicating a starting position of an SMTC window or a measurement gap within a respective periodicity of the neighbor cell.

Further, the report of the updates of measurement gap configuration and optionally SMTC configuration can be triggered in various ways. For example, the report of the updates can be triggered by:

When a neighbor cell SSB moves out of a current gap configuration. For example, the UE 101 can determine or predict when an SSB of the neighbor cell 141 is to move out of a current measurement gap configuration. The determination or prediction can be based on a location of the UE 101, location information of the satellites 103 and 105 (e.g., ephemerides or PVT information), and optionally the delay information of the feeder links 111 and 114. In some examples, the UE 101 can detect an SSB of the neighbor cell 141 moves out of a current measurement gap configuration.

A request from the network.

When a propagation delay for the neighbor cell 141 has changed by a difference larger than or equal to a threshold. For example, after a current SMTC and/or measurement gap configuration are determined by the UE 101 or received from the network, the UE 101 can monitor or determine when the change of the propagation delay of the neighbor cell 141 will be larger than the threshold. The UE 101 can report the updates at that moment.

When a propagation delay difference between the neighbor cell 141 and the serving cell 142 has changed by a difference larger than or equal to a threshold.

When a timer expires.

When a location of the UE 101 changes by a certain margin.

In some embodiments, the report of the updates of measurement gap configuration and optionally SMTC configuration can be periodic.

In some embodiments, SMTC offsets and measurement gap offsets are updated from the network to the UE 101 on a per neighbor cell basis. For example, for each neighbor cell, the network can determine time offsets of SMTCs and measurement gap configurations from time to time. The resulting SMTC windows and measurement gaps can align with SSB signals that are constantly moving with respect to the timing of the serving cell 142 or the UE 101. In other examples, the SMTC offsets and measurement gap offsets are determined by the UE 101 on a per neighbor cell basis and reported to the network prior to updating from the network to the UE 101.

In some examples, the above SMTC offsets and measurement gap offsets on a per neighbor cell basis can be signaled from the network to the UE 101 by using:

MAC CE (for frequent updates, e.g., with up to n×100 ms intervals).

RRC signaling (for less frequent updates, e.g., with intervals of several seconds).

In some example, the UE 101 can confirm the reception of the measurement gap (and optionally SMTC) updates from the network. One transmission of the confirmation can be per reception of the measurement gap (and optionally SMTC) update or can correspond to multiple times of reception of the updates. For example, the conformation can use one of the following signaling methods:

MAC CE.

Hybrid automatic repeat request (HARD) feedback.

Radio network temporary identifier (RNTI).

In some embodiments, instead of updating SMTC and measurement gap configurations regularly, SSB signals from neighbor cells are expanded. Due to the expansion, part of the expanded signals can still be captured in previously configured SMTC windows and measurement gaps even the expanded signals have drifted away from their previous positions in time domain. For example, a copy of an SSB burst can be prepended or appended to the original SSB burst to expand the SSB burst. Or, a portion of an SSB burst (e.g., one or more SSBs) can be disposed to be ahead of or after the original SSB burst to expand the SSB burst.

Figure 4:
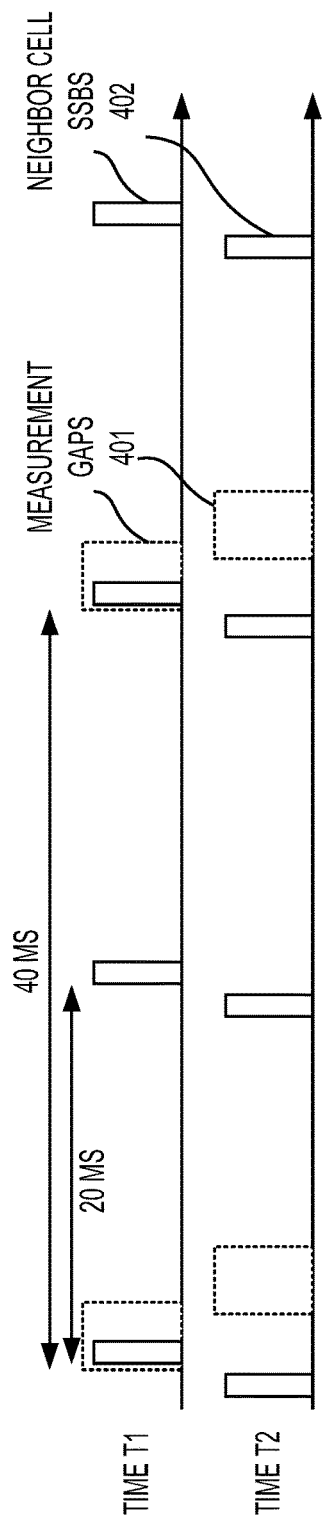
FIGS. 4-6 show some examples of configuring additional SSBs to extend SSB signals.
Figure 5:
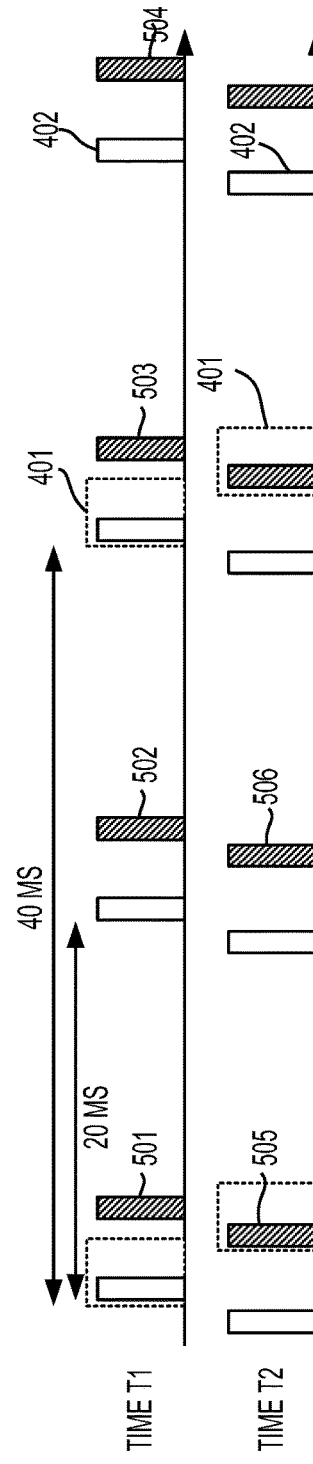
Figure 6:
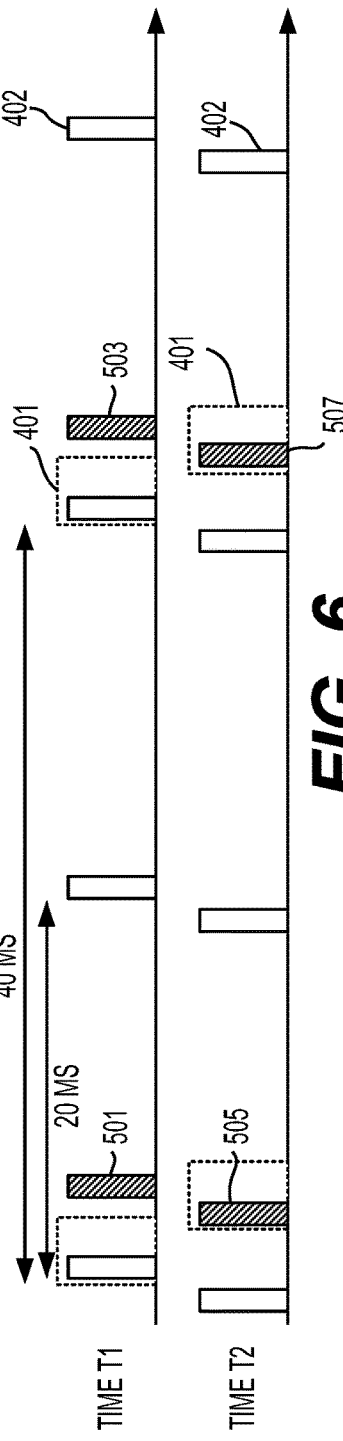

FIGS. 4-6 below show some examples of configuring additional SSBs to extend SSB signals. Each SSB burst is shown to include a single SSB in FIGS. 4-6. Measurement gaps are used as an example to explain the scheme without showing SMTC windows. Timings of SSB signals and measurement gaps shown FIGS. 4-6 can be based on the time at the UE 101. For example, the time of the UE 101 can be indicated or represented by frame, subframe, or slot numbers or indices.

FIG. 4 shows a sequence of neighbor cell SSBs 402 corresponding to the neighbor cell 141, for example. The SSBs 402 can be transmitted with a period of 20 ms. FIG. 4 also shows a sequence of measurement gaps 401 configured for the UE 101 with a period of 40 ms. Around time T1, when the neighbor cell SSBs 402 are received at the UE 101, the measurement gaps 401 are aligned with the neighbor cell SSBs 402. Around time T2, due to the mobility of the serving cell 142 and the neighbor cell 141, a propagation delay difference between the serving cell 142 and the neighbor cell 141 has changed compared with that of time T1. Accordingly, the timings of the neighbor cell SSBs 402 are changed with respect to the timings of the measurement gaps at the UE 101. As shown, the SSBs 402 drifts outside of the measurement gaps 401 around time T2.

FIG. 5 shows a solution for handling the situation in FIG. 4. Specifically, additional neighbor cell SSBs 501-508 are configured to be positioned close in time to the existing SSBs 402. As shown, around Time T1, the additional SSBs 501-504 are positioned outside the measurement gaps 401. Around Time T2, the additional SSBs 505-508 are positioned inside the measurement gaps 401 due to the drift of the timings of SSB signals 505-508. In an example, at least one neighbor cell SSB always falls within the serving cell measurement gaps 401.

In the FIG. 5 example, the number of transmitted SSBs is doubled, resulting in a 100% overhead increase compared with the FIG. 4 scenario. In other examples, additional SSBs can be configured to be transmitted only around the measurement gap occasions, resulting in a non-uniform SSB burst pattern. With the non-uniform SSB burst pattern, the overhead caused by the additional SSBs can be reduced.

FIG. 6 shows an example of a reduced SSB overhead. The SSBs 502, 504, 506, and 508 shown in FIG. 5 are not transmitted, resulting in a 50% SSB overhead increase. In another example, the measurement gaps in FIG. 4 are changed to be 80 ms apart. With the non-uniform SSB burst pattern where additional SSBs are transmitted around measurement gaps, the SSB overhead increase is 25% compared with the FIG. 4 scenario.

In some examples, a satellite with a payload can be configured to transmit multiple beams each corresponding to a cell. Among the multiple beams, the edge beams may surround the other beams to cover the surface of the Erath. For a UE performing handover, an edge cell of a neighbor satellite can most probably be a target cell than other beams. In such a configuration, the scheme of transmitting additional SSBs can be used only in edge beams. Transmitting additional SSBs only on edge beams can have less overhead compared with transmitting additional SSBs on both the edge and non-edge cells.

The non-uniform SSB burst approach can be combined with the scheme of configuring and updating SMTC windows and measurement gaps on a per-cell basis, or can be employed independently in various embodiments.

Figure 7:
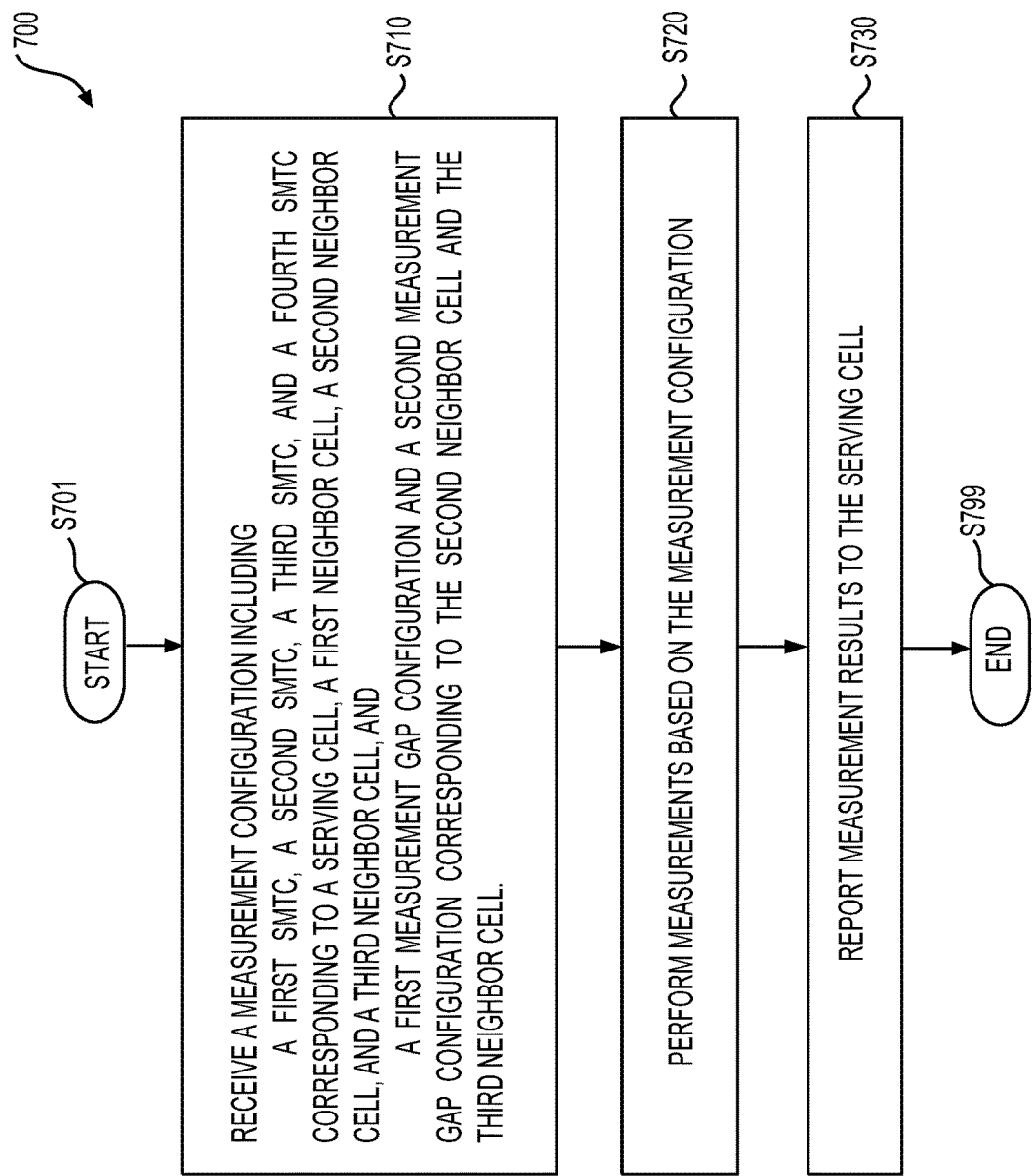
FIG. 7 shows a measurement process 700 according to some embodiments of the disclosure.

FIG. 7 shows a measurement process 700 according to some embodiments of the disclosure. The measurement process 700 can be performed to implement the mechanisms for determination and update of measurement configurations to handle the large and changing reference signal propagation delay differences between a serving cell and neighbor cells in an NTN. The process 700 can start from S701 and proceed to S710.

At S710, a measurement configuration can be received from a serving cell of a UE in a NTN. The NTN can provide mobile communication service based on flying objects, such as satellites, airplanes, balloons, airships, UAVs, and the like. The measurement configuration can indicate a first SMTC and a second SMTC. The first SMTC specifies a set of first SMTC windows aligning with SSB signals from the serving cell of the UE. The second SMTC specifies a set of second SMTC windows aligning with SSB signals from a first neighbor cell of the UE. The serving cell is associated with a first flying object, and the first neighbor cell is associated with a second flying object. In an example, the serving cell and the first neighbor cell can operate on a first carrier.

In an example, the measurement configuration can further indicate a third SMTC and a fourth SMTC. The third SMTC specifies third SMTC windows aligning with SSB signals of a second neighbor cell of the UE. The second neighbor cell operates on a second carrier. The fourth SMTC specifies fourth SMTC windows aligning with SSB signals of a third neighbor cell of the UE. The third neighbor cell can also operate on the second carrier. The second neighbor cell and the third neighbor cell can each be associated with a flying object.

In an example, the measurement configuration can further indicate a first measurement gap configuration and a second measurement gap configuration. The first measurement gap configuration corresponds to the second neighbor cell. The second measurement gap configuration corresponds to the third neighbor cell. The first measurement gap specifies measurement gaps that are aligned with the third SMTC windows. The second measurement gap specifies measurement gaps that are aligned with the fourth SMTC windows.

At S720, measurements can be performed based on the received measurement configuration. For example, a first measurement on the first carrier can be performed based on the first SMTC corresponding to the serving cell and the second SMTC corresponding to the first neighbor cell. A second measurement on the second carrier can be performed based on the first measurement gap configuration, the second measurement gap configuration, the third SMTC, and the fourth SMTC.

At S730, results of the first and second measurement gaps can be reported from the UE to the serving cell. For example, the measurement results can include results of different measurement types, such as reference signal received power (RSRP), reference signal received quality (RSRQ), received signal strength indicator (RSSI), and the like. In other examples, the results of the first and second measurement gaps are used locally, for example, to make a decision of a conditional handover. The process 700 can proceed to S799 and terminate at S799.

Figure 8:
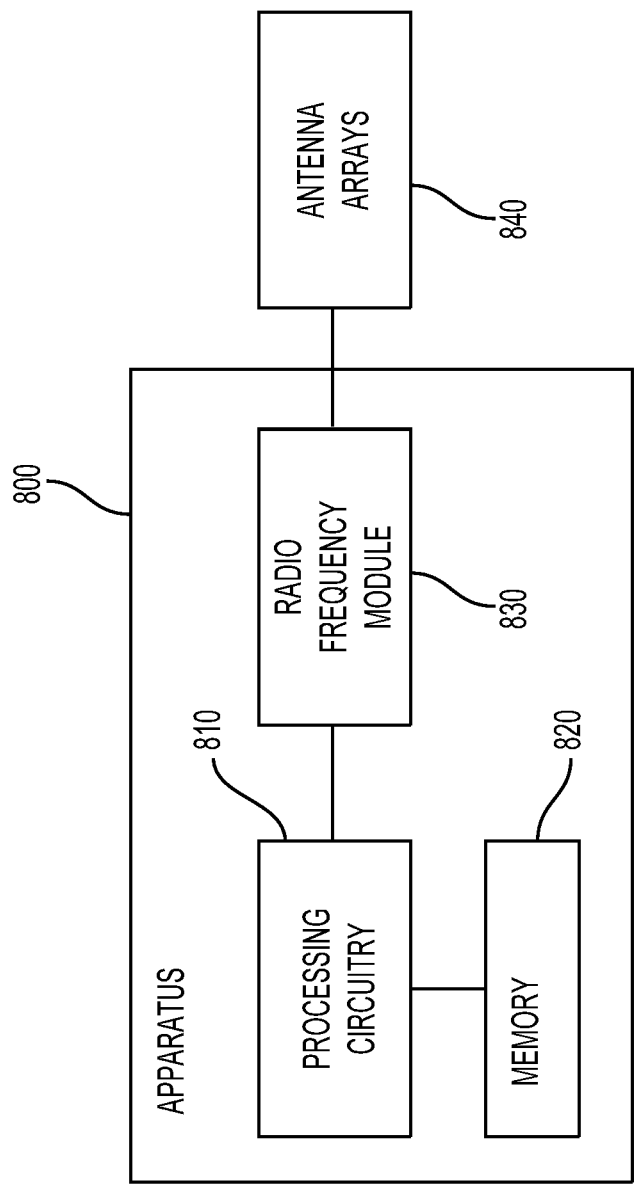
FIG. 8 shows an exemplary apparatus 800 according to embodiments of the disclosure.

FIG. 8 shows an exemplary apparatus 800 according to embodiments of the disclosure. The apparatus 800 can be configured to perform various functions in accordance with one or more embodiments or examples described herein. Thus, the apparatus 800 can provide means for implementation of mechanisms, techniques, processes, functions, components, systems described herein. For example, the apparatus 800 can be used to implement functions of UEs or base stations in various embodiments and examples described herein. The apparatus 800 can include a general-purpose processor or specially designed circuits to implement various functions, components, or processes described herein in various embodiments. The apparatus 800 can include processing circuitry 810, a memory 820, and a radio frequency (RF) module 830.

In various examples, the processing circuitry 810 can include circuitry configured to perform the functions and processes described herein in combination with software or without software. In various examples, the processing circuitry 810 can be a digital signal processor (DSP), an application-specific integrated circuit (ASIC), programmable logic devices (PLDs), field-programmable gate arrays (FPGAs), digitally enhanced circuits, or comparable device or a combination thereof.

In some other examples, the processing circuitry 810 can be a central processing unit (CPU) configured to execute program instructions to perform various functions and processes described herein. Accordingly, the memory 820 can be configured to store program instructions. The processing circuitry 810, when executing the program instructions, can perform the functions and processes. The memory 820 can further store other programs or data, such as operating systems, application programs, and the like. The memory 820 can include non-transitory storage media, such as a read-only memory (ROM), a random access memory (RAM), a flash memory, a solid-state memory, a hard disk drive, an optical disk drive, and the like.

In an embodiment, the RF module 830 receives a processed data signal from the processing circuitry 810 and converts the data signal to beamforming wireless signals that are then transmitted via antenna arrays 840, or vice versa. The RF module 830 can include a digital to analog converter (DAC), an analog to digital converter (ADC), a frequency up converter, a frequency down converter, filters and amplifiers for reception and transmission operations. The RF module 830 can include multi-antenna circuitry for beamforming operations. For example, the multi-antenna circuitry can include an uplink spatial filter circuit, and a downlink spatial filter circuit for shifting analog signal phases or scaling analog signal amplitudes. The antenna arrays 840 can include one or more antenna arrays.

The apparatus 800 can optionally include other components, such as input and output devices, additional or signal processing circuitry, and the like. Accordingly, the apparatus 800 may be capable of performing other additional functions, such as executing application programs and processing alternative communication protocols.

The processes and functions described herein can be implemented as a computer program which, when executed by one or more processors, can cause the one or more processors to perform the respective processes and functions. The computer program may be stored or distributed on a suitable medium, such as an optical storage medium or a solid-state medium supplied together with, or as part of, other hardware. The computer program may also be distributed in other forms, such as via the Internet or other wired or wireless telecommunication systems. For example, the computer program can be obtained and loaded into an apparatus, including obtaining the computer program through a physical medium or distributed system, including, for example, from a server connected to the Internet.

The computer program may be accessible from a computer-readable medium providing program instructions for use by or in connection with a computer or any instruction execution system. The computer-readable medium may include any apparatus that stores, communicates, propagates, or transports the computer program for use by or in connection with an instruction execution system, apparatus, or device. The computer-readable medium can be magnetic, optical, electronic, electromagnetic, infrared, or semiconductor system (or apparatus or device) or a propagation medium. The computer-readable medium may include a computer-readable non-transitory storage medium such as a semiconductor or solid-state memory, magnetic tape, a removable computer diskette, a random access memory (RAM), a read-only memory (ROM), a magnetic disk and an optical disk, and the like. The computer-readable non-transitory storage medium can include all types of computer-readable medium, including magnetic storage medium, optical storage medium, flash medium, and solid-state storage medium.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method, comprising:
receiving a measurement configuration from a serving cell of a user equipment (UE) in a non-terrestrial network (NTN) providing mobile communication service based on satellites belonging to the NTN, the satellites being low Earth orbiting (LEO) satellites or geostationary Earth orbiting (GEO) satellites, the measurement configuration indicating a first synchronization signal block (SSB) based measurement timing configuration (SMTC) and a second SMTC, the first SMTC specifying first SMTC windows aligning with SSB signals from the serving cell of the UE, the second SMTC specifying second SMTC windows aligning with SSB signals from a first neighbor cell of the UE, the serving cell associated with a first satellite, the first neighbor cell associated with a second satellite, a third SMTC that specifies third SMTC windows aligning with SSB signals of a second neighbor cell of the UE operating on a second carrier, and a fourth SMTC that specifies fourth SMTC windows aligning with SSB signals of a third neighbor cell of the UE operating on the second carrier, and wherein the measurement configuration further indicates a first measurement gap configuration corresponding to the second neighbor cell and a second measurement gap configuration corresponding to the third neighbor cell, the first measurement gap specifying measurement gaps that are aligned with the third SMTC windows, the second measurement gap specifying measurement gaps that are aligned with the fourth SMTC windows;
performing a measurement based on the first SMTC corresponding to the serving cell and the second SMTC corresponding to the first neighbor cell; and
performing a measurement on the second carrier based on the first measurement gap configuration, the second measurement gap configuration, the third SMTC, and the fourth SMTC
receiving information indicating a position of the second satellite associated with the first neighbor cell from the serving cell;
determining an SMTC offset based on the position of the second satellite associated with the first neighbor cell, the SMTC offset being based on a timing of the serving cell, the SMTC offset being one of:
a time offset with respect to the first SMTC,
a time offset with respect to the second SMTC, or
a time offset indicating a starting position of an SMTC window within a periodicity of the second SMTC; and
reporting a service link propagation delay difference between the serving cell and the first neighbor cell based on the SMTC offset.

2. The method of claim 1, wherein the serving cell and the first neighbor cell operates on a first carrier.

3. The method of claim 1, wherein the information indicating the position of the second satellite includes one of:

position-velocity-time (PVT) information of the second satellite, or
orbital ephemeris parameters of the second satellite.

4. The method of claim 3, wherein the information further indicates a feeder link delay of the first neighbor cell.

5. The method of claim 1, further comprising:
determining a measurement gap offset based on a position of a third satellite associated with the second neighbor cell, the measurement gap offset being based on a timing of the serving cell, the measurement gap offset being one of:
a time offset with respect to the first measurement gap configuration corresponding to the second neighbor cell,
a time offset with respect to the first SMTC,
a time offset indicating a starting position of a measurement gap within a periodicity of the first measurement gap configuration corresponding to the second neighbor cell; and
transmitting the measurement gap offset to the serving cell.

6. The method of claim 5, further comprising:
receiving from the serving cell an updated measurement configuration indicating:
a fifth SMTC corresponding to the first neighbor cell of the UE and determined based on the SMTC offset, and
a third measurement gap configuration corresponding to the second neighbor cell and determined based on the measurement gap offset.

7. The method of claim 6, wherein the updated measurement configuration indicates the fifth SMTC by providing the SMTC offset and the third measurement gap configuration by providing the measurement gap offset.

8. The method of claim 6, wherein the updated measurement configuration is received using a MAC CE or RRC signaling.

9. The method of claim 6, further comprising:
transmitting a MAC CE, a HARQ feedback, or an RNTI to the serving cell to confirm reception of the updated measurement configuration.

10. The method of claim 5, further comprising:
receiving from the serving cell a confirmation corresponding to one of the SMTC offset and the measurement gap offset.

11. The method of claim 1, further comprising:
transmitting information indicating a location of the UE to the serving cell; and
receiving an update indicating an SMTC offset corresponding to one of the first, second, and third neighbor cells and a measurement gap offset corresponding to one of the second and third neighbor cells.

12. The method of claim 1, further comprising:
receiving periodically an update of an ephemeris, PVT information, and/or a feeder link delay of the second satellite associated with the first neighbor cell from the serving cell through one or a combination of a system information block (SIB), a radio resource control (RRC) signaling, and a MAC control element (CE).

13. The method of claim 1, further comprising:
determining an SMTC offset corresponding to the first neighbor cell based on a long-term ephemeris of the second satellite;
determining a measurement gap offset corresponding to the second neighbor cell based on a long-term ephemeris of a third satellite associated with the second neighbor cell; and transmitting the SMTC offset and the measurement gap offset to the serving cell.

14. The method of claim 1, further comprising:
transmitting an SMTC offset and a measurement gap offset in response to one of:
  an SSB signal moving out of the measurement gaps specified by one of the first and second measurement gap configurations,
  a request from the serving cell,
  a propagation delay of one of the first, second, and third neighbor cells changing by an amount equal to a threshold,
  expiry of a timer, and
  a location change of the UE by a certain margin.

15. The method of claim 1, wherein the SSB signals of the second neighbor cell include:
a sequence of periodically transmitted first SSB bursts, and for each first SSB burst overlapping with the measurement gaps of the first measurement gap configuration, a second SSB burst that is adjacent to the respective first SSB burst in time domain.

16. An apparatus, comprising circuitry configured to:
receive a measurement configuration from a serving cell of a user equipment (UE) in a non-terrestrial network (NTN) providing mobile communication service based on satellites belonging to the NTN, the satellites being low Earth orbiting (LEO) satellites or geostationary Earth orbiting (GEO) satellites, the measurement configuration indicating a first synchronization signal block (SSB) based measurement timing configuration (SMTC) and a second SMTC, the first SMTC specifying first SMTC windows aligning with SSB signals from the serving cell of the UE, the second SMTC specifying second SMTC windows aligning with SSB signals from a first neighbor cell of the UE, the serving cell associated with a first satellite, the first neighbor cell associated with a second satellite, a third SMTC that specifies third SMTC windows aligning with SSB signals of a second neighbor cell of the UE operating on a second carrier, and a fourth SMTC that specifies fourth SMTC windows aligning with SSB signals of a third neighbor cell of the UE operating on the second carrier, and wherein the measurement configuration further indicates a first measurement gap configuration corresponding to the second neighbor cell and a second measurement gap configuration corresponding to the third neighbor cell, the first measurement gap specifying measurement gaps that are aligned with the third SMTC windows, the second measurement gap specifying measurement gaps that are aligned with the fourth SMTC windows;
perform a measurement based on the first SMTC corresponding to the serving cell and the second SMTC corresponding to the first neighbor cell; and
perform a measurement on the second carrier based on the first measurement gap configuration, the second measurement gap configuration, the third SMTC, and the fourth SMTC
receive information indicating a position of the second satellite associated with the first neighbor cell from the serving cell;
determine an SMTC offset based on the position of the second satellite associated with the first neighbor cell, the SMTC offset being based on a timing of the serving cell, the SMTC offset being one of:
  a time offset with respect to the first SMTC,
  a time offset with respect to the second SMTC, or
  a time offset indicating a starting position of an SMTC window within a periodicity of the second SMTC; and
report a service link propagation delay difference between the serving cell and the first neighbor cell based on the SMTC offset.

17. A non-transitory computer-readable medium storing instructions that, when executed by a processor, cause the processor to perform a method, the method comprising:
receiving a measurement configuration from a serving cell in a non-terrestrial network (NTN) at a user equipment (UE), the NTN providing mobile communication service based on satellites belonging to the NTN, the satellites being low Earth orbiting (LEO) satellites or geostationary Earth orbiting (GEO) satellites, the measurement configuration indicating a first synchronization signal block (SSB) based measurement timing configuration (SMTC) and a second SMTC, the first SMTC specifying first SMTC windows aligning with SSB signals from the serving cell of the UE, the second SMTC specifying second SMTC windows aligning with SSB signals from a first neighbor cell of the UE, the serving cell associated with a first satellite, the first neighbor cell associated with a second satellite, a third SMTC that specifies third SMTC windows aligning with SSB signals of a second neighbor cell of the UE operating on a second carrier, and a fourth SMTC that specifies fourth SMTC windows aligning with SSB signals of a third neighbor cell of the UE operating on the second carrier, and wherein the measurement configuration further indicates a first measurement gap configuration corresponding to the second neighbor cell and a second measurement gap configuration corresponding to the third neighbor cell, the first measurement gap specifying measurement gaps that are aligned with the third SMTC windows, the second measurement gap specifying measurement gaps that are aligned with the fourth SMTC windows;
performing a measurement based on the first SMTC corresponding to the serving cell and the second SMTC corresponding to the first neighbor cell; and
performing a measurement on the second carrier based on the first measurement gap configuration, the second measurement gap configuration, the third SMTC, and the fourth SMTC
receiving information indicating a position of the second satellite associated with the first neighbor cell from the serving cell;
determining an SMTC offset based on the position of the second satellite associated with the first neighbor cell, the SMTC offset being based on a timing of the serving cell, the SMTC offset being one of:
  a time offset with respect to the first SMTC,
  a time offset with respect to the second SMTC, or
  a time offset indicating a starting position of an SMTC window within a periodicity of the second SMTC; and
reporting a service link propagation delay difference between the serving cell and the first neighbor cell based on the SMTC offset.

* * * * *